(12) United States Patent
Wang

(10) Patent No.: US 9,925,566 B2
(45) Date of Patent: Mar. 27, 2018

(54) ELECTRONIC PRODUCT SORTING SYSTEM AND SORTING METHOD

(71) Applicant: LEADOT INNOVATION, INC., Kaohsiung (TW)

(72) Inventor: Justin Wang, Taipei (TW)

(73) Assignee: LEADOT INNOVATION, INC., Kaosiung (TW)

( * ) Notice: Subject to any disclaimer, the term of this patent is extended or adjusted under 35 U.S.C. 154(b) by 0 days.

(21) Appl. No.: 15/339,914

(22) Filed: Oct. 31, 2016

(65) Prior Publication Data

US 2017/0120301 A1 May 4, 2017

(30) Foreign Application Priority Data

Nov. 4, 2015 (TW) .............................. 104136259 A

(51) Int. Cl.
| | |
|---|---|
| *B07C 5/00* | (2006.01) |
| *B07C 5/342* | (2006.01) |
| *B07C 5/28* | (2006.01) |
| *B07C 5/16* | (2006.01) |
| *H04N 5/232* | (2006.01) |

(52) U.S. Cl.
CPC .............. *B07C 5/3422* (2013.01); *B07C 5/16* (2013.01); *B07C 5/28* (2013.01); *H04N 5/23229* (2013.01); *Y02W 90/20* (2015.05)

(58) Field of Classification Search
CPC .. G06T 7/00; G06T 7/001; B07C 5/16; B07C 5/28; B07C 5/3422
See application file for complete search history.

(56) References Cited

U.S. PATENT DOCUMENTS

| | | | | |
|---|---|---|---|---|
| 5,887,073 | A * | 3/1999 | Fazzari | B07C 5/3422 209/580 |
| 5,960,104 | A * | 9/1999 | Conners | G01N 21/8986 144/402 |
| 6,701,001 | B1 * | 3/2004 | Kenneway | B07C 5/3422 382/141 |
| 9,600,101 | B2 * | 3/2017 | Trenholm-Boyle | G06F 3/0383 |
| 2009/0134221 | A1 * | 5/2009 | Zhu | A47F 9/046 235/383 |

(Continued)

FOREIGN PATENT DOCUMENTS

| | | |
|---|---|---|
| CN | 101806856 A | 8/2010 |
| CN | 102728561 A | 10/2012 |

(Continued)

*Primary Examiner* — Terrell H Matthews
(74) *Attorney, Agent, or Firm* — Winston Hsu

(57) ABSTRACT

An electronic product sorting system includes a conveying device; an image capturing device configured to capture at least one image of an electronic product; a storage unit configured to pre-store appearance characteristic information of a plurality of predetermined electronic products; a processing unit coupled to the image capturing device and the storage unit, configured to determine appearance characteristic information of the electronic product according to the at least one image of the electronic product, and generate a comparison result by comparing the appearance characteristic information of the electronic product and the plurality of predetermined electronic products; and a sorting unit configured to sort the electronic product according to the comparison result.

10 Claims, 4 Drawing Sheets

(56) References Cited

U.S. PATENT DOCUMENTS

| | | | | |
|---|---|---|---|---|
| 2015/0212010 | A1* | 7/2015 | Lin | G01N 21/90 348/92 |
| 2016/0125266 | A1* | 5/2016 | Fujiwara | G06T 7/001 382/215 |
| 2016/0364868 | A1* | 12/2016 | Takahashi | G01N 21/9508 |

FOREIGN PATENT DOCUMENTS

| | | |
|---|---|---|
| CN | 104148301 A | 11/2014 |
| DE | 42 39 642 A1 | 6/1994 |
| DE | 100 31 260 A1 | 1/2001 |
| DE | 10 2011 012 592 A1 | 8/2012 |
| EP | 0 795 919 A2 | 9/1997 |
| JP | 20019435 A | 1/2001 |
| JP | 201424048 A | 2/2014 |
| TW | M362075 U1 | 8/2009 |

* cited by examiner

ELECTRONIC PRODUCT SORTING SYSTEM AND SORTING METHOD

BACKGROUND OF THE INVENTION

1. Field of the Invention

The present invention relates to an electronic product sorting system and a sorting method, and more particularly, to an electronic product sorting system and a sorting method capable of sorting electronic products according to pre-stored characteristic information.

2. Description of the Prior Art

AS related technology keeps improving, various kinds of electronic products with different functions are developed. Since developing speeds of the electronic products are getting faster, life cycles of the electronic products are gradually getting shorter. As such, there are some electronic products out of date even if they are still working normally. Based on needs for environmental protection, an outdated electronic product can be recycled or delivered to less-developed areas for reuse. However, there are various kinds of electronic products, it is difficult to rapidly and efficiently sort the different electronic products in the prior art.

SUMMARY OF THE INVENTION

The present invention provides an electronic product sorting system comprising a conveying device; an image capturing device configured to capture at least one image of an electronic product conveyed by the conveying device; a storage unit configured to pre-store appearance characteristic information of a plurality of predetermined electronic products; a processing unit coupled to the image capturing device and the storage unit, and configured to determine appearance characteristic information of the electronic product according to the at least one image of the electronic product and generate a comparison result by comparing appearance characteristic information of the electronic product and the plurality of predetermined electronic products in the storage unit; and a sorting unit configured to sort the electronic product according to the comparison result.

The present invention further provides an electronic product sorting system comprising pre-storing appearance characteristic information of a plurality of predetermined electronic products; pre-storing appearance characteristic information of a plurality of predetermined electronic products; generating a comparison result by comparing appearance characteristic information of the electronic product and the plurality of predetermined electronic products; and sorting the electronic product according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Since each electronic product has specific appearance and component arrangement according to design requirements, the present invention provides an electronic product sorting system capable of sorting electronic products according to appearance characteristic information of the electronic products.

Figure 1:
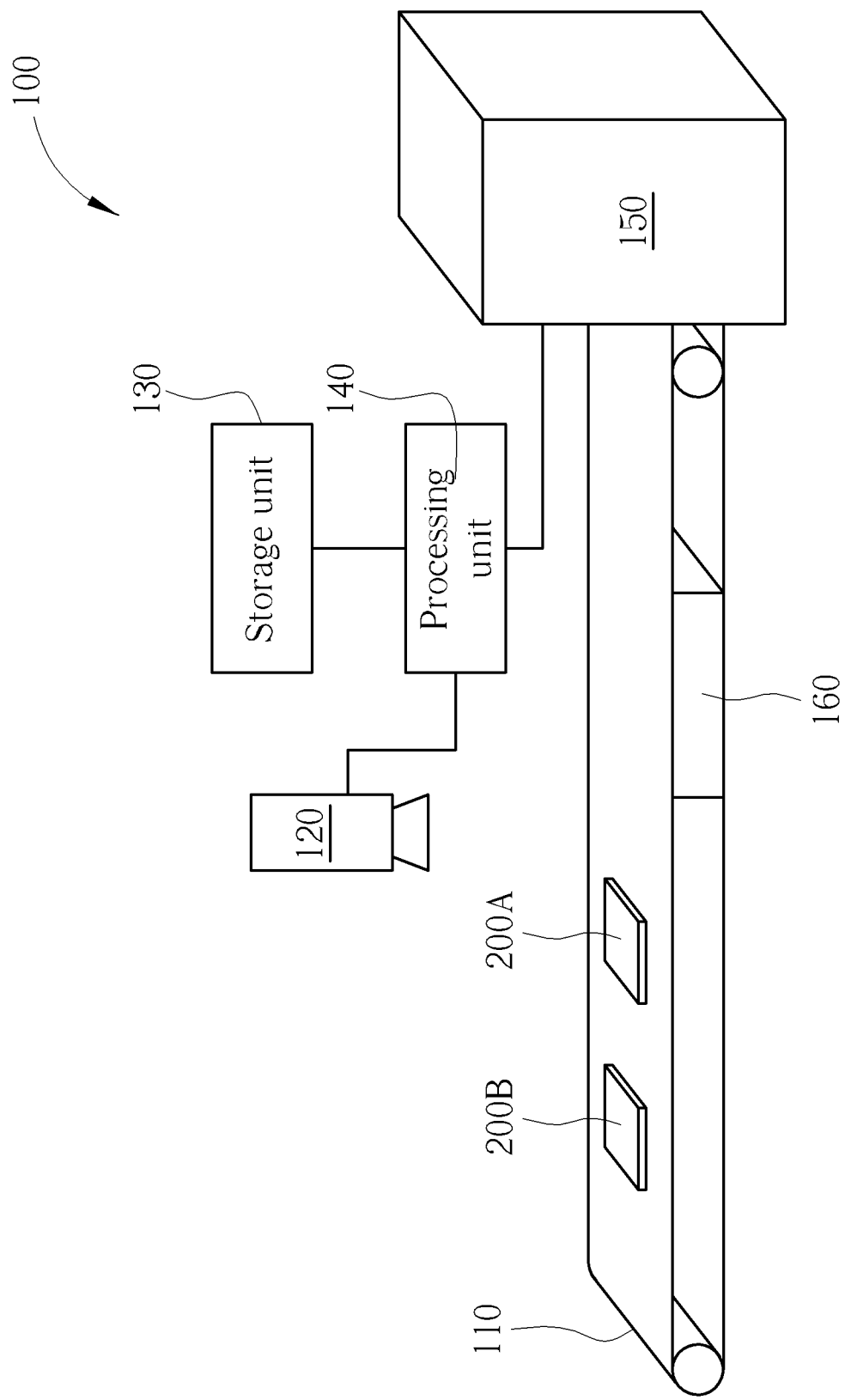
FIG. 1 is a diagram showing an electronic product sorting system of the present invention.

Please refer to FIG. 1. FIG. 1 is a diagram showing an electronic product sorting system of the present invention. As shown in FIG. 1, the electronic product sorting system 100 of the present invention comprises a conveying device 110, an image capturing device 120, a storage unit 130, a processing unit 140, and a sorting unit 150. The conveying device 110 is configured to convey electronic products. When different electronic products 200A, 200B are placed on the conveying device 110, the conveying device conveys the electronic products 200A, 200B respectively to be in front of the image capturing device 120. The image capturing device 120 is configured to capture images of the electronic products 200A, 200B conveyed by the conveying device 110. The storage unit 130 is configured to pre-store appearance characteristic information of a plurality of predetermined electronic products. The processing unit 140 is coupled to the image capturing device 120 and the storage unit 130. The processing unit 140 is configured to determine appearance characteristic information of the electronic products 200A, 200B according to the images of the electronic products 200A, 200B captured by the image capturing device 120, and generate a comparison result by comparing the appearance characteristic information of the electronic products 200A, 200B with the appearance characteristic information of the plurality of predetermined electronic products pre-stored in the storage unit. The sorting unit 150 is coupled to the processing unit 140 and configured to sort the electronic products 200A, 200B according to the comparison result generated by the processing unit 140.

Figure 2:
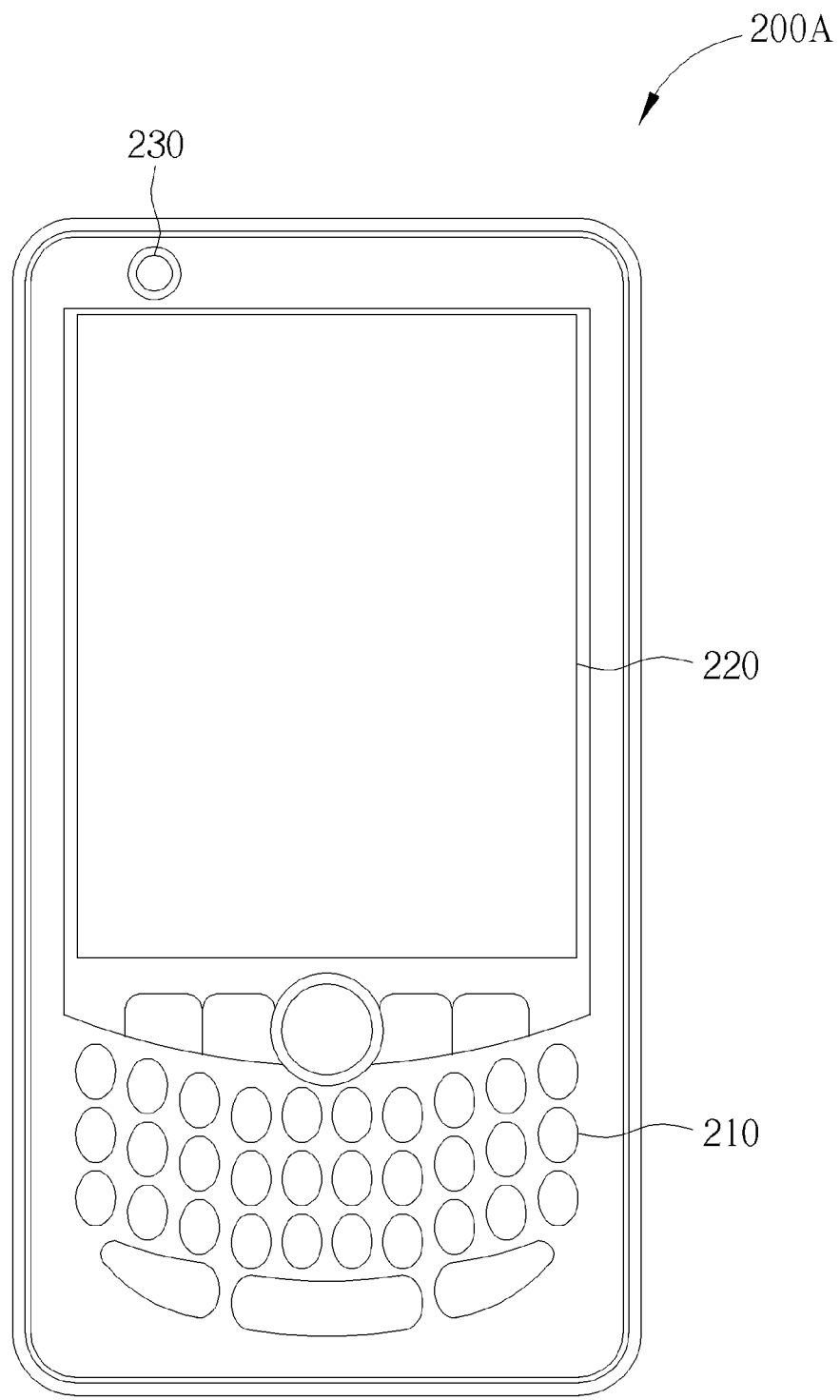
FIG. 2 is a diagram illustrating a processing unit in FIG. 1 determining appearance characteristic information of an electronic product according to an image of the electronic product.

Please refer to FIG. 2, and refer to FIG. 1 as well. FIG. 2 is a diagram illustrating the processing unit in FIG. 1 determining appearance characteristic information of an electronic product according to an image of the electronic product. As shown in FIG. 2, the processing unit 140 can determine appearance characteristic information of the electronic product 200A according to the image of the electronic product 200A captured by the image capturing device 120. The appearance characteristic information of the electronic product 200A can be an area, a width, a height, a color, a component arrangement, a component quantity and/or a component dimension of the electronic product 200A. For example, the processing unit 140 can determine dimensions of the electronic product 200A and its components according to a reference scale (for example, a reference scale arranged on the conveying device 110); the component arrangement of the electronic product 200A can be relative positions between buttons 210 and a screen 220; the component quantity of the electronic product 200A can be a quantity of the buttons 210 or a quantity of a specific component (such as a camera module 230); and the component dimensions of the electronic product 200A can be dimensions of the button 210 and the screen 220. The processing unit 140 can compare the appearance characteristic information of the electronic product 200A with the appearance characteristic information of the plurality of predetermined electronic products (such as areas, widths, heights, colors, component arrangements, component quantities and/or component dimensions) one by one, in order to generate a comparison result.

Figure 3:
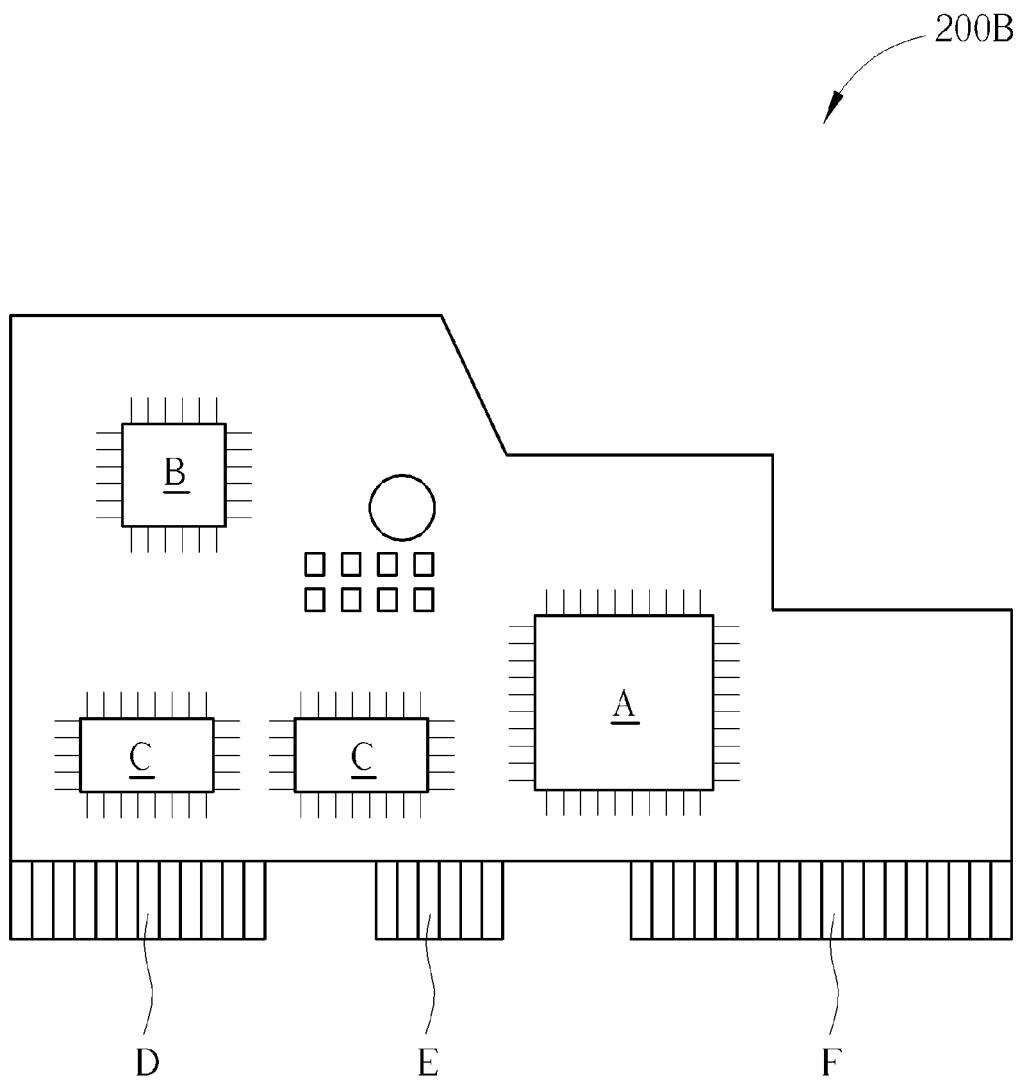
FIG. 3 is a diagram illustrating the processing unit in FIG. 1 determining appearance characteristic information of an electronic product according to the image of the electronic product.

Please refer to FIG. 3, and refer to FIG. 1 as well. FIG. 3 is a diagram illustrating the processing unit in FIG. 1 determining appearance characteristic information of an electronic product according to an image of the electronic product. As shown in FIG. 3, when the electronic product 200B is a printed circuit board, the processing unit can determine appearance characteristic information of the electronic product 200B according to an image of the electronic product 200B captured by the image capturing device 120. The appearance characteristic information of the electronic product 200B can be a printed circuit board area, a printed circuit board width, a printed circuit board height, a printed circuit board color, a chip arrangement, a chip quantity, a chip dimension and/or printed words on chips of the electronic product 200B. For example, the chip arrangement can be relative positions between chips A, B, C on the printed circuit board; the chip quantity can be a quantity of all chips A, B, C, or a quantity of chips with a particular type or model name. The processing unit 140 can compare the appearance characteristic information of the electronic product 200B with the appearance characteristic information of the plurality of predetermined electronic product pre-stored in the storage unit 130 (such as printed circuit board areas, printed circuit board widths, printed circuit board heights, printed circuit board colors, chip arrangements, chip quantities, chip dimensions and/or printed words on chips) one by one, in order to generate a comparison result.

When the appearance characteristic information of the electronic product 200A or 200B corresponds to the appearance characteristic information of one of the predetermined electronic products pre-stored in the storage unit 130, the processing unit 140 can determine the model name or type of the electronic product 200A or 200B. The sorting unit 150 then further transfers the electronic product 200A or 200B to a corresponding conveying path or moves the electronic product 200A or 200B to a corresponding outlet according to the model name or type of the electronic product 200A or 200B, in order to sort the electronic products 200A, 200B.

When the appearance characteristic information of the electronic product 200A or 200B does not correspond to the appearance characteristic information of the plurality of predetermined electronic products pre-stored in the storage unit 130, the processing unit can further store the appearance characteristic information of the electronic product 200A or 200B in the storage unit 130 in order to establish appearance characteristic information of a new predetermined electronic product. Moreover, when the chips A, B, C on the electronic product 200B does not correspond to any type or model name of the chips pre-stored in the storage unit 130, the processing unit 140 can further store the appearance characteristic information of the chips A, B, C in the storage unit 130, in order to facilitate subsequent comparisons.

In addition, the electronic product sorting system 100 of the present invention can further comprise a weight measurement unit 160 configured to measure a weight of the electronic products 200A, 200B. The storage unit 130 can be further configured to pre-store weight information of the plurality of predetermined electronic products. The processing unit 140 can simultaneously compare the appearance characteristic information and the weight of the electronic product 200A or 200B with the appearance characteristic information and the weights of the plurality of predetermined electronic products, such that the comparison result generated by the processing unit 140 can be more accurate.

Moreover, the storage unit 130 can further pre-store three-dimensional outline information of the plurality of predetermined electronic products. The electronic product sorting system 100 of the present invention can further obtain three-dimensional outline information of the electronic products 200A, 200B. For example, the electronic product sorting system 100 can use a three-dimensional scanner to obtain the three-dimensional outline information of the electronic products 200A, 200B, or determine the three-dimensional outline information of the electronic products 200A, 200B according to a plurality of images of the electronic products 200A, 200B captured by the image capturing device 120 at different focal lengths. The processing unit 140 can simultaneously compare the appearance characteristic information and the three-dimensional outline information (and/or the weights) of the electronic product 200A or 200B with the appearance characteristic information and the three-dimensional outline information (and/or the weights) of the plurality of predetermined electronic product pre-stored in the storage unit 130. Therefore, the comparison result generated by the processing unit 140 can be more accurate.

In one embodiment of the present invention, the processing unit 140 of the electronic product sorting system 100 of the present invention can further compare appearance characteristic information of a plurality of electronic components on the electronic product 200B with the appearance characteristic information of the plurality of predetermined electronic products pre-stored in the storage unit 130, in order to determine characteristic values of the plurality of electronic components. For example, the processing unit 140 can first determine that the electronic product 200B comprises the chips A, B, C and edge board contacts D, E, F, and then further determine areas of the chips A, B, C and the edge board contacts D, E, F. Characteristic values of the chips A, B, C and the edge board contacts D, E, F can be equal to the corresponding areas. The processing unit 140 can obtain a comparison result by dividing a summation of the characteristic values of the chips A, B, C and the edge board contacts D, E, F by the area or weight of the electronic product 200B. A higher comparison result means that the electronic product 200B has a higher recyclable percentage. The sorting 150 then transfers the electronic product 200B to the corresponding conveying path according to a level of the comparison result of the electronic product 200B, in order to sort the electronic product 200B.

In another embodiment of the present invention, each characteristic value of the chips A, B, C and the edge board contacts D, E, F can be obtained by multiplying an area of each of the chips A, B, C and the edge board contacts D, E, F by a weighting value corresponding to a characteristic of each of the chips A, B, C and the edge board contacts D, E, F. The processing unit 140 can further determine weighting values corresponding to the chips A, B, C according to package types of the chips A, B, C. For example, when the chip A is packaged by a ball grid array package technique, the weighting value corresponding to the chip A is higher; and when the chip A is packaged by a dual in-line package technique, the weighting value corresponding to the chip A is lower. The processing unit 140 can also further determines weighting values corresponding to the edge board contacts D, E, F according to plating materials of the edge board contacts D, E, F. For example, when a surface of the edge board contact D is formed by gold plating, the weighting value corresponding to the edge board contact D is higher; and when the surface of the edge board contact D is formed by silver plating, the weighting value corresponding to the edge board contact D is lower. The processing unit 140 can obtain the characteristic value of the chip A by multiplying the area of the chip A by the weighting value corresponding to the chip A. Similarly, the characteristic values of the chips B, C and the edge board contacts D, E, F can be also obtained by the same way. Thereafter, the processing unit 140 can obtain a comparison result by dividing the summation of the characteristic values of the chips A, B, C and the edge board contacts D, E, F by the areas or weights of the electronic product 200B. A higher the comparison result means that the electronic product 200B has a higher recycle value. The sorting unit 150 then transfers the electronic product 200B to the corresponding conveying path according to a level of the comparison result of the electronic product 200B, in order to sort the electronic product 200B.

The above embodiments are examples of the present invention for recycling the electronic products. But the present invention is not limited thereto. Moreover, the characteristics and weighting values of the electronic components are illustrated for example. The characteristics and weighting values of the electronic components can be determined according to different sorting requirements.

On the other hand, in the electronic product sorting system 100 of the present invention, the storage unit 130 can be a cloud storage unit. The processing unit 140 can be linked to the storage unit 130 through Internet. According to the above arrangement, the storage unit can be linked to a plurality of electronic product sorting systems, in order to provide information of different finds of the predetermined electronic products. The storage unit can also collect and store newly established information of the new predetermined electronic products from the plurality of electronic product sorting systems, in order to improve comparison efficiency and capability of the electronic product sorting systems.

Figure 4:
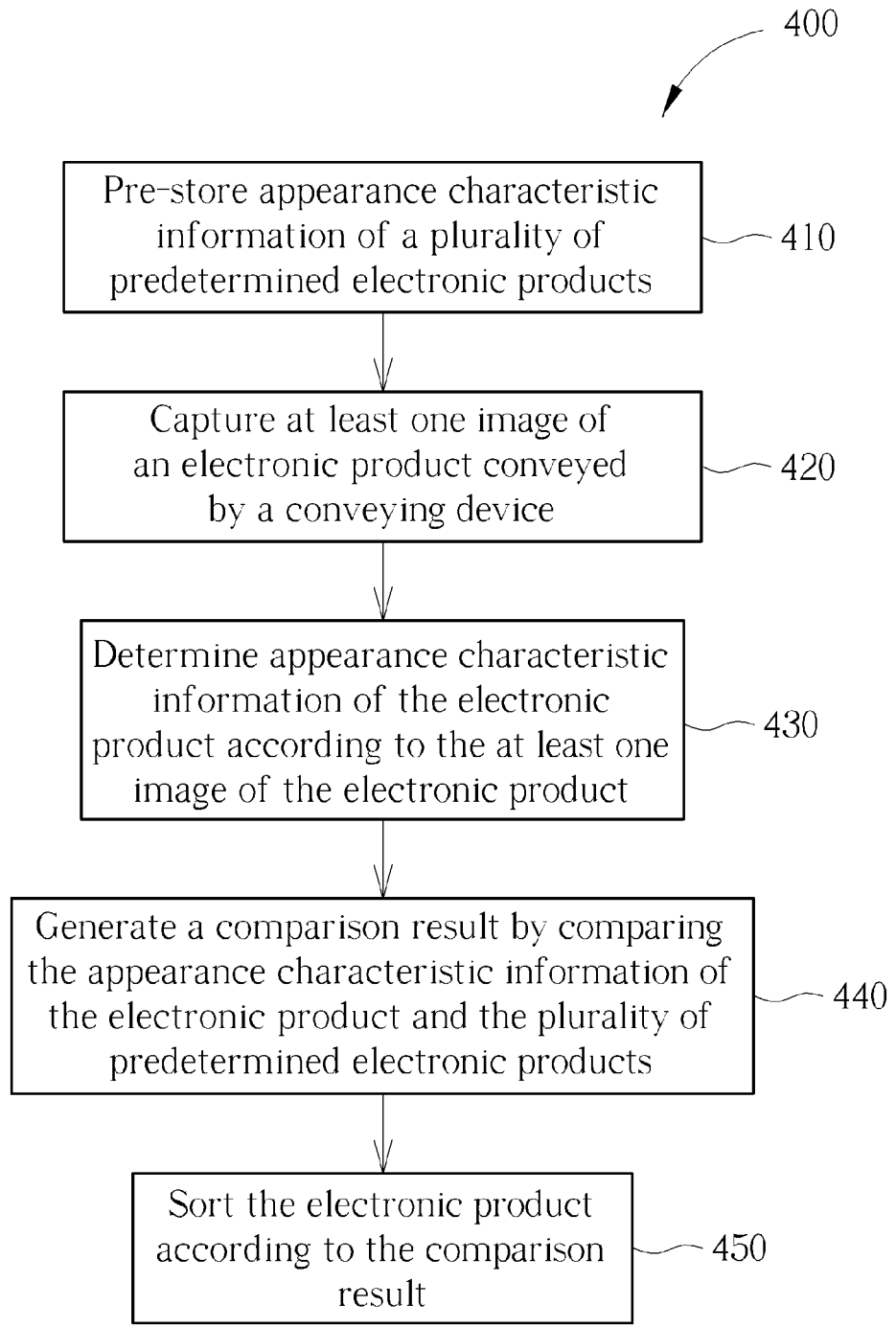
FIG. 4 is a flowchart showing an electronic product sorting method of the present invention.

Please refer to FIG. 4. FIG. 4 is a flowchart 400 showing an electronic product sorting method of the present invention. The flowchart of the electronic product sorting method of the present invention comprises the following steps:

Step 410: Pre-store appearance characteristic information of a plurality of predetermined electronic products;

Step 420: Capture at least one image of an electronic product conveyed by a conveying device;

Step 430: Determine appearance characteristic information of the electronic product according to the at least one image of the electronic product;

Step 440: Generate a comparison result by comparing the appearance characteristic information of the electronic product and the plurality of predetermined electronic products; and Step 450: Sort the electronic product according to the comparison result.

On the other hand, the electronic product sorting method of the present invention is not limited to the above steps. Other steps can be intermediate. Moreover, the steps of the electronic product sorting method of the present invention need not be in the exact order shown.

In contrast to the prior art, the electronic product sorting system and sorting method of the present invention can sort the electronic products according to the appearance characteristic information, the weights, and/or the three-dimensional outline information of the electronic products, and can establish new information of the electronic product during the comparing process in order to further improve comparison efficiency and capability of the electronic product sorting system. Therefore, the electronic product sorting system of the present invention can rapidly and efficiently sort different electronic products.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic product sorting method, comprising:
   pre-storing appearance characteristic information of a plurality of predetermined electronic products;
   capturing at least one image of an electronic product conveyed by a conveying device;
   determining appearance characteristic information of the electronic product according to the at least one image of the electronic product;
   generating a comparison result by comparing the appearance characteristic information of the electronic product and the plurality of predetermined electronic products; and
   sorting the electronic product according to the comparison result;
   wherein comparing the appearance characteristic information of the electronic product and the plurality of predetermined electronic products is comparing appearance characteristic information of a plurality of electronic components on the electronic product and the appearance characteristic information of the plurality of predetermined electronic products in order to determine characteristic values corresponding to the plurality of electronic components on the electronic product, wherein the comparison result is obtained by dividing a summation of the characteristic values corresponding to the plurality of electronic components by an area or weight of the electronic product.

2. The electronic product sorting method of claim 1, wherein the characteristic value corresponding to the electronic component is obtained by multiplying an area of the electronic component by a weighting value corresponding to a characteristic of the electronic component.

3. An electronic product sorting method, comprising:
   pre-storing appearance characteristic information and weight information of a plurality of predetermined electronic products;
   capturing at least one image of an electronic product conveyed by a conveying device;
   measuring a weight of the electronic product;
   determining appearance characteristic information of the electronic product according to the at least one image of the electronic product;
   generating a comparison result by comparing the appearance characteristic information and the weights of the electronic product and the plurality of predetermined electronic products; and
   sorting the electronic product according to the comparison result.

4. The electronic product sorting method of claim 1, wherein comparing the appearance characteristic information of the electronic product and the plurality of predetermined electronic products comprises:
   comparing areas, widths, heights, colors, component arrangements, component quantities and/or component dimensions of the electronic product and the plurality of predetermined electronic products.

5. The electronic product sorting method of claim 1, wherein the electronic product and the plurality of predetermined electronic products are printed circuit boards, and comparing the appearance characteristic information of the electronic product and the plurality of predetermined electronic products comprises:

comparing printed circuit board areas, printed circuit board widths, printed circuit board heights, printed circuit board colors, chip arrangements, chip quantities, chip dimensions and/or printed words on chips of the electronic product and the plurality of predetermined electronic products.

6. The electronic product sorting method of claim 1 further comprising:

storing the appearance information of the electronic product when the appearance information of the electronic product does not correspond to that of the plurality of predetermined electronic products.

7. The electronic product sorting method of claim 3, wherein comparing the appearance characteristic information of the electronic product and the plurality of predetermined electronic products comprises:

comparing areas, widths, heights, colors, component arrangements, component quantities and/or component dimensions of the electronic product and the plurality of predetermined electronic products.

8. The electronic product sorting method of claim 3, wherein the electronic product and the plurality of predetermined electronic products are printed circuit boards, and comparing the appearance characteristic information of the electronic product and the plurality of predetermined electronic products comprises:

comparing printed circuit board areas, printed circuit board widths, printed circuit board heights, printed circuit board colors, chip arrangements, chip quantities, chip dimensions and/or printed words on chips of the electronic product and the plurality of predetermined electronic products.

9. The electronic product sorting method of claim 3 further comprising:

pre-storing three-dimensional outline information of the plurality of redetermined electronic products;

measuring three-dimensional outline information of the electronic product; and comparing three-dimensional outline information of the electronic product and the plurality of predetermined electronic products;

wherein the comparison result is generated by comparing the appearance information, the weights and the three-dimensional outline information of the electronic product and the plurality of predetermined electronic products.

10. The electronic product sorting method of claim 3 further comprising:

storing the appearance information of the electronic product when the appearance information of the electronic product does not correspond to that of the plurality of predetermined electronic products.

* * * * *

UNITED STATES PATENT AND TRADEMARK OFFICE
CERTIFICATE OF CORRECTION

PATENT NO.        : 9,925,566 B2
APPLICATION NO.   : 15/339914
DATED             : March 27, 2018
INVENTOR(S)       : Justin Wang Page 1 of 1

It is certified that error appears in the above-identified patent and that said Letters Patent is hereby corrected as shown below:

On the Title Page

Item (73), correct the residence of the assignee from "Kaosiung (TW)" to --Kaohsiung (TW)--.

Signed and Sealed this
Third Day of July, 2018

Andrei Iancu
*Director of the United States Patent and Trademark Office*